United States Patent [19]
Korshun

[11] Patent Number: 5,952,641
[45] Date of Patent: Sep. 14, 1999

[54] SECURITY DEVICE FOR CONTROLLING THE ACCESS TO A PERSONAL COMPUTER OR TO A COMPUTER TERMINAL

[75] Inventor: Yvan Korshun, Kharkov, Ukraine

[73] Assignee: C-SAM S.A., Switzerland

[21] Appl. No.: 08/752,575

[22] Filed: Nov. 21, 1996

[30] Foreign Application Priority Data

Nov. 28, 1995 [CH] Switzerland ............................ 3375/95

[51] Int. Cl.[6] .................................................... G06X 5/00
[52] U.S. Cl. .......................... 235/382; 235/380; 235/375; 902/4; 902/5; 902/26
[58] Field of Search .................................... 235/382, 380, 235/375; 402/3, 4, 5, 26

[56] References Cited

U.S. PATENT DOCUMENTS

| | | | |
|---|---|---|---|
| 4,582,985 | 4/1986 | Lofberg .......................................... | 902/3 |
| 4,839,506 | 6/1989 | Homma et al. ................................ | 902/5 |
| 4,901,068 | 2/1990 | Benton et al. ....................... | 340/825.31 |
| 5,053,608 | 10/1991 | Senanayake ................................. | 902/3 |
| 5,130,519 | 7/1992 | Bush et al. .................................... | 902/5 |
| 5,187,352 | 2/1993 | Blair et al. ................................ | 235/382 |
| 5,355,414 | 10/1994 | Hale et al. .................................. | 380/25 |
| 5,367,149 | 11/1994 | Takahira ........................................ | 902/5 |
| 5,448,045 | 9/1995 | Clark ........................................ | 235/382 |
| 5,724,027 | 3/1998 | Shipman et al. ................... | 340/825.31 |
| 5,754,675 | 5/1998 | Valdier ......................................... | 902/5 |

FOREIGN PATENT DOCUMENTS

| | | |
|---|---|---|
| 0496344 | 1/1992 | European Pat. Off. . |
| 4015482 | 7/1991 | Germany . |
| 19508288 | 10/1995 | Germany . |
| 0005195 | 1/1990 | Japan ......................................... 902/3 |
| 8203286 | 9/1982 | WIPO . |

OTHER PUBLICATIONS

IBM Technical Disclosure Bulletin.

*Primary Examiner*—Donald Hajec
*Assistant Examiner*—Douglas X. Rodriguez
*Attorney, Agent, or Firm*—Silverman, Cass & Singer, Ltd.

[57] ABSTRACT

The mouse of the computer is equipped with a reader of an access code located in one or a set of chipcards for users. The reader is connected to an antenna equipping the mouse so that the user has only to present his card to the mouse inside the influence zone of the antenna for obtaining that the access code is transmitted to the computer and that the security device rendering the computer inoperant is unlocked.

7 Claims, 2 Drawing Sheets

SECURITY DEVICE FOR CONTROLLING THE ACCESS TO A PERSONAL COMPUTER OR TO A COMPUTER TERMINAL

BACKGROUND OF THE INVENTION a) Field of the Invention

The present invention relates to a security device for controlling the access to a personal computer or to a computer-network terminal allowing use of such only with the aid of an access code.

b) Description of the Prior Art

Such security devices are known per se. In these known devices the user of the PC or of the computer terminal, which is authorized, knows the access code and introduces it into the PC or into the computer terminal with the help of a keyboard related thereto.

This method of operation does not exclude unauthorized use due, in particular, to possible indiscretions of the authorized user.

SUMMARY OF THE INVENTION

The object of the present invention is to remove this drawback by supplying means permitting the introduction of the access code into the PC or into the computer terminal without the authorized user even has to know this code.

Practically, the rule will precisely be that the user will not know this code.

This object is achieved by the fact that the access code is located in a portable support which has to be presented to a detector connected to the said computer or network terminal, the authorized user, bearing the said code support, having not necessarily to know that code.

The various features of the invention will be apparent from the following description, drawings and claims, the scope of the invention not being limited to the drawings themselves as the drawings are only for the purpose of illustrating ways in which the principles of the invention can be applied. Other embodiments of the invention utilising the same or equivalent principles may be used and structural changes may be made as desired by those skilled in the art without departing from the present invention and the purview of the appended claims.

DESCRIPTION OF THE PREFERRED EMBODIMENTS

Figure 1:
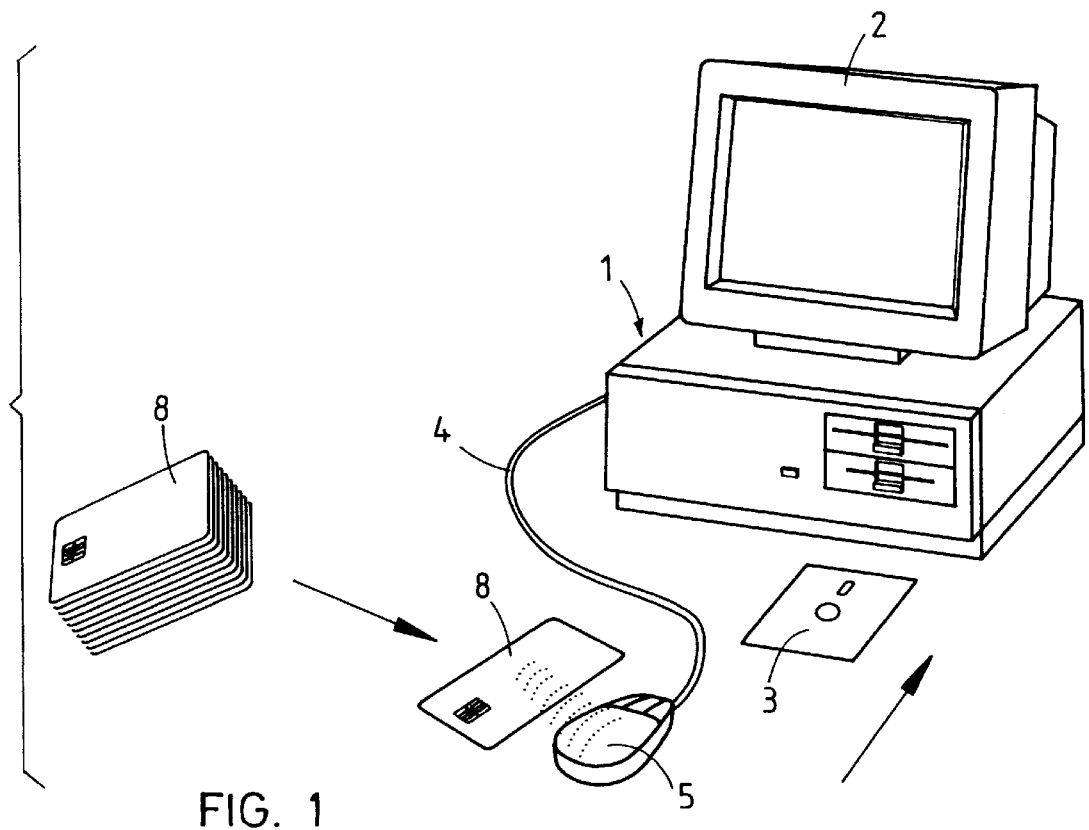
FIG. 1 is a view in perspective of a PC.
Figure 2:
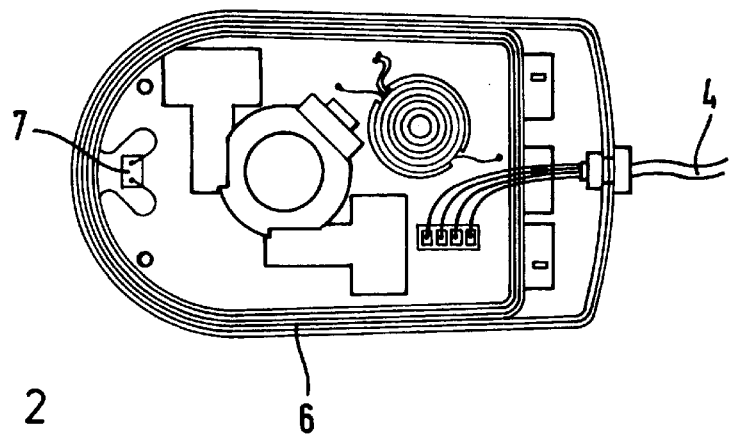
FIG. 2 is a view of a detail.

The personal computer—hereafter PC—represented in FIG. 1 is generally designated by reference 1. It is surmounted by a display screen 2. A program on a floppy disket ready to be placed into the PC 1 has been represented in 3. A mouse, connected to a PC 1 via a cable 4, is shown in 5. This mouse is provided with an antenna 6 and with a reader or information detector 7 connected to the said antenna (FIG. 2).

The installation comprises moreover a set of chipcards the memory of which contains an access code to the computer 1.

Figure 3:
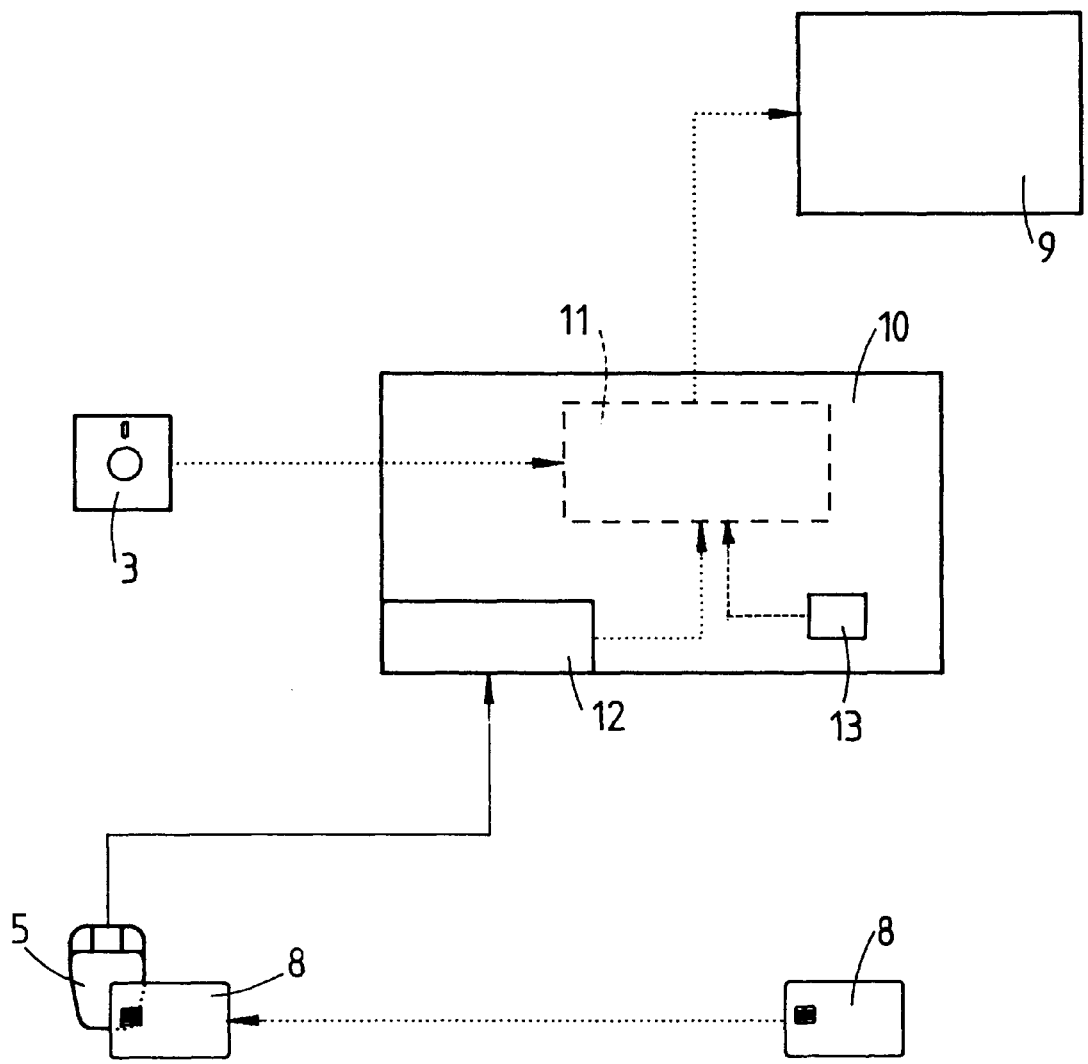
FIG. 3 illustrates diagrammatically the operational principle of this PC.

The diagram of the installation illustrated in FIG. 3, where the elements appear in form of blocs, includes a periphery 9 comprising all the usual components of a PC (hard disc, program, files, network), a basic system 10 including the basic input-output system BIOS 11, a memory 12 and a microprocessor $\mu P$ 13. The floppy disket 3 is also represented in this figure as well as the mouse 5 and two users chip cards 8.

The present installation is used as follows: each authorized user is provided with a chipcard 8 and he presents this card to the mouse 5 when he wants to use the computer. The access code contained in the memory of the chipcard 8 will be detected by the antenna 6 of the mouse 5 and transmitted to the computer 1 by the cable 4. The computer 1 will compare the access code of the card 8 to the access code contained in his memory 12 and in case of identity shall unlock the security device so that the computer may be used.

The user or the users do not need to know and must not know the access codes, that avoids that indiscretions may be committed.

To increase the security, the user's cards may also be equipped with detector means, of biometric characters of the users, for example the finger print of their index. Each user must then place their index finger on the said detector means so that the access code may be recognized by the computer. Thus unauthorized use of the cards will be excluded.

To assure a large flexibility in the use of such an installation, information related to the access codes or to the personal biometric codes of the users may be introduced in the memory of the computer by presenting new access cards 8 to the mouse 5 while introducing into the computer a master card without which the information contained in the memory of the computer cannot be modified.

The supports of the access codes have not necessarily to be constituted by cards but may also consist in other portable means like badges, watches, electronic agendas, or others.

In the example as described and represented, the detector of the access code is in the mouse. This has the advantage of avoiding any modification of the computer itself to apply the invention thereto, so more that the cable 4 connecting the mouse 5 to the computer 1 is the conventional connection cable of a mouse. The reader 7 of the mouse 5 contains commutation means and when a user's card is presented to the mouse, the informations related to the access code are transmitted to the computer. When the user's card is no more situated in the influence zone of the antenna 6, the regular information of the mouse are transmitted to the computer.

However, the detection means or reading means of the access code could also be mounted on other distinct elements (than the mouse) of the computer, for example on a keyboard for introducing the data into the computer, on a printer piloted by the computer, or on a modem. These reading means could also be integrated in the computer itself.

In the example as described and represented, the reading is a proximity reading without contact between the reader and the portable support containing the access code, owing to the use of an antenna. But it would also be possible that the support of the access code and the detection means are provided with contacts so that the reading is electrically effected by means of these contacts.

It is also precised that the information contained in the supports of the access codes have not to be all identical but could contain different elements of information related to each user so that all the users have not the possibility of access to all the functions of the computer or terminal network, whereby the access is selective.

It may also be provided that the computer or network terminal is arranged in such a way that the access code has to be presented more than one time during the work so that a non authorized user cannot substitute himself to the authorized user in the course of the work.

The present invention has a large range of applications like: telebanking, videotext, information network like Internet, etc. . . . It may be applied to any equipment with an integrated computer, for example a photocopying machine or other types of machines.

I claim:

1. A security device for controlling access to a computer or to a network terminal, the security device including means to permit its use only with an access code, said device comprising, a portable support in which said access code is located, an access code reader connected to said computer or network terminal for cooperation with said portable support to enable the access code to be presented to the reader, said access code not necessarily known to the authorized user of the portable support, said reader being carried by a mouse which is distinct from the computer or the network terminal.

2. A security device as claimed in claim 1, in which the portable support includes reading or detection means of some biometric characteristics of the authorized user.

3. A security device as claimed in claim 1, in which the access code is contained in the memory of a chipcard constituting the support of the portable code.

4. A security device as claimed in claim 1, in which the reader of the access code is carried by a keyboard connected to the computer or to the network terminal.

5. A security device as claimed in claim 1, in which the reader of the access code is mounted on the computer or the network terminal itself.

6. A security device as claimed in claim 1, in which the access code reader is equipped with an antenna so that the reading can be effected without a material contact between the support of the access code and the said reader is necessary.

7. A security device as claimed in claim 1, in which the reader of the access code and the support of this code are both provided with contact areas so that the reading can take place only when the respective contact areas are in contact with each other.

* * * * *